Patented Oct. 14, 1952

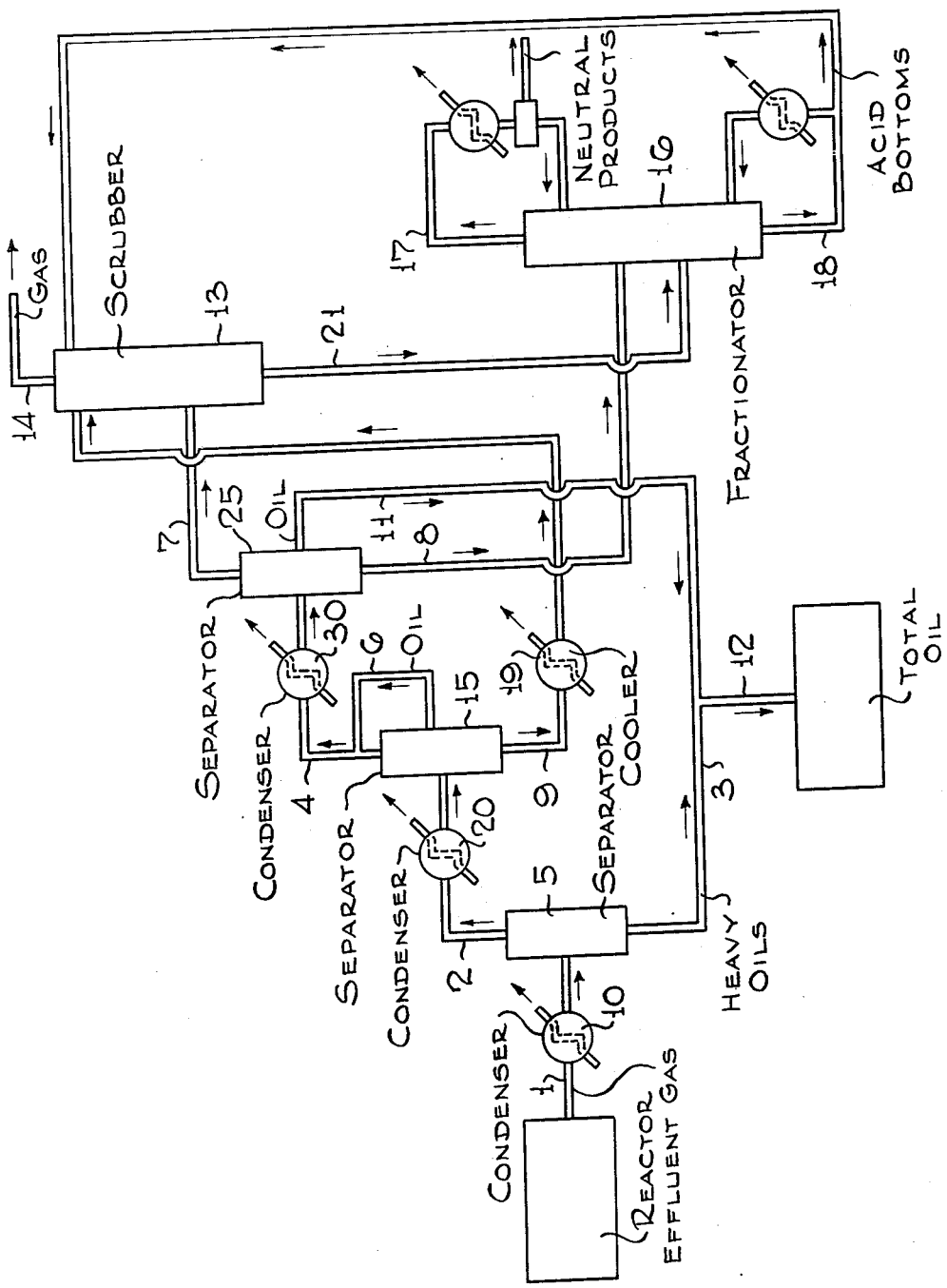

2,614,115

UNITED STATES PATENT OFFICE 2,614,115

MULTISTAGE PROCESS FOR CONDENSING HYDROCARBON SYNTHESIS PRODUCTS

William E. Catterall, Elizabeth, and Ernest O. Ohsol, Cranford, N. J., assignors to Standard Oil Development Company, a corporation of Delaware Application September 22, 1948, Serial No. 50,647

1 Claim. (Cl. 260—450)

This invention relates to an improved process for separating and recovering low molecular weight oxygenated products formed in organic synthesis reactions. More particularly it relates to an improved commercially feasible process for the separation of neutral low molecular weight oxygenated products formed along with large quantities of water in hydrocarbon synthesis reactions.

Hydrocarbon synthesis reactions are performed by contacting hydrogen and oxides of carbon with catalysts under various temperature and pressure conditions. The temperatures employed vary widely, as for example, in the range from about 200° C. to about 425° C. and are generally in the range from 260° C. to about 370° C. The particular temperature employed depends upon, among other factors, the type of non-gaseous hydrocarbon product desired, the character and the activity of the particular catalyst utilized, the through-put and composition of the synthetic gases and upon the reaction pressure. The pressures, likewise, vary considerably and are a function of other operative conditions such as catalyst employed, activity of the catalyst, character of the feed gases and the temperatures utilized. Operations such as described are generally conducted under conditions to secure the maximum yield of hydrocarbon constituents containing 4 or more carbon atoms in the molecule. However, under the conditions of the operation, various side reactions occur which result in the production of valuable oxygenated compounds.

The relative proportion of the various types of products obtained also varies with the conditions. In all cases, however, vapor products removed overhead as effluent from the reaction zone are condensed and segregated into a hydrocarbon oil phase and an aqueous phase.

The oxygenated compounds found in the water layer comprise the neutral compounds including alcohols, aldehydes, ketones, esters, and fatty acids.

The gaseous products in the before-mentioned effluent which are to be condensed have present with them a relatively large quantity of uncondensable gases, including hydrogen, carbon monoxide, carbon dioxide, nitrogen and methane. Upon cooling a typical effluent mixture to normally available cooling water temperatures, valuable quantities of vaporized neutral low molecular weight oxygenated compounds remain uncondensed also, although the concentration of the uncondensed oxygenated compounds in the gas is very low. The degree of recovery of the before-mentioned oxygenated compounds can be improved by scrubbing the uncondensed gas with water, but due to the dilution of the oxygenated compounds in the gas, the maximum possible concentration in the scrubber water is low. The heat and equipment requirements for fractionating the resulting extremely dilute water solution are excessive and seriously limit the attractiveness of the water scrubbing method.

The object of this invention is to provide an improved commercially feasible process for the recovery of these neutral low molecular weight oxygenated products.

Other objects will be apparent to those skilled in the art.

This invention comprises a process for combining the condensing and scrubbing operations so as to increase the degree of recovery of the neutral low molecular weight oxygenated products without dilution of the medium in which they are recovered.

The method comprises in effect, the condensation of the water in at least two stages. In the first stage the reaction product is cooled to a temperature only sufficiently low to condense a major portion of the water vapor. The uncondensed gas from the first stage is then condensed to a lower temperature in the second stage, conveniently the temperature of the cooling water. The uncondensed gas from the second stage is scrubbed countercurrently with cool aqueous condensate from the first stage. The overall result is an improvement in the degree of recovery of neutral oxygenated products with respect to single stage water condensation but the total amount of water in which these products are recovered is not increased. Thus the cost of the subsequent concentration step has not been increased significantly. If desired, the initial condensation of water may be carried out in more than one stage with correspondingly superior results.

This differential condensation of water results in a smaller quantity of the neutral low molecular weight oxygenated products being condensed in the water in the first water condensation step than occurs where all the water is condensed in one operation. A higher concentration of these oxygenated products is consequently found in the uncondensed gases. These uncondensed gases thus constitute a richer feed of the neutral low molecular weight oxygenated products for the subsequent scrubbing operation.

The general term "neutral low molecular weight oxygenated products" as used herein denotes those oxygenated products more volatile than water in the presence of dilute water solutions. The presence of large quantities of water and uncondensible gases increases the volatility of neutral low molecular weight oxygenated products. Typical of these compounds are acetaldehyde, propionaldehyde, ethyl acetate, acetone, methyl, ethyl ketone, ethanol, propanols, butanols.

This invention will be better understood by reference to the following flow diagram.

A synthesis reaction product gas at 400 p. s. i. g., and a temperature of 316° C., containing 370 mols of total oxygenated compounds, enters through line 1 and is cooled in condenser 10 to a temperature of about 138° C., or a similar temperature slightly above the water dew-point. This conventional step removes a waxy oil condensate to avoid possible fouling of colder condensers with wax deposits. This step can be eliminated if the presence of these waxy materials does not constitute a problem. The partially condensed mixture passes to separator 5. The waxy oil condensate leaves separator 5 through line 3. The uncondensed gases leave separator 5 through line 2 and are cooled in condenser 20 to about 82° C., at which temperature a major proportion of the water, fatty acids, and some hydrocarbons are condensed along with a minor proportion of the neutral low molecular weight oxygenated products. This mixture enters separator 15. The uncondensed gas, containing neutral low molecular weight oxygenated products, from separator 15 passes overhead through line 4 to condenser 30. In condenser 30 the remaining water and hydrocarbon oils are condensed along with another minor proportion of the neutral low molecular weight oxygenated products. The collected oil condensate from separator 15 is withdrawn through line 6 and remixed with the uncondensed gases in line 4. This oil condensate is returned in order to take advantage of its action as a solvent for the lighter hydrocarbons in the final condenser. The mixture is further cooled in condenser 30 to 38° C., and passed on to separator 25. The oil layer in separator 25 is withdrawn through line 11 and combined with the oil in line 3 into a total oil condensate in line 12 which is, therefore, essentially unaffected by this differential separation. The water condensate layer from separator 15 leaves as bottoms through line 9 and is cooled in cooler 19 to 38° C., and sent to an upper portion of scrubber 13. The uncondensed gas leaves separator 25 through line 7 and enters a lower portion of scrubber 13. A countercurrent scrubbing action is thereby secured. The water condensate layer from separator 25 is withdrawn through line 8 to fractionating tower 16. The scrubber bottoms from scrubber 13 are withdrawn through line 21 to fractionating tower 16. The neutral oxygenated products are distilled overhead through line 17 from fractionating tower 16 and the acid water bottoms are withdrawn through line 18. The acids can be recovered elsewhere.

The effectiveness of the process of this invention has been demonstrated by determining the degree of recovery of neutral low molecular weight oxygenated vapor products under the conditions shown in this example for a reaction gas of the following composition where 84% of the water was condensed in the first stage at 82° C:

| | | | |
|---|---|---|---|
| $H_2$, CO, $CO_2$, and $N_2$ | mol | | 52,340 |
| Hydrocarbons | do | | 16,510 |
| $H_2O$ | do | | 8,505 |
| Oxygenated compounds: | | | |
| Acetaldehyde | do | 25.9 | |
| Propionaldehyde | do | 22.2 | |
| Ethyl acetate | do | 33.3 | |
| Acetone | do | 25.8 | |
| MEK | do | 22.2 | |
| Ethanol | do | 138.8 | |
| Propanol | do | 46.3 | |
| Butanol | do | 14.8 | |
| Total neutral oxygenated compounds | mol | | 329.3 |
| Acetic acid | do | 29.6 | |
| Propionic acid | do | 11.1 | |
| Total acids | do | | 40.7 |
| Total Oxygenated Compounds | do | | 370 |
| | | | 77,725 |

The determinations take into consideration the abnormally high volatilities of these low molecular weight oxygenated compounds in dilute water solutions and in the presence of uncondensible gases.

The utility of the process of this invention is further considered in the table below through the determination of the effectiveness of various possible modifications of conditions in the recovery of the neutral low molecular weight oxygenated products.

In the table below are considered four alternative means of recovering the neutral low molecular weight oxygenated products. These alternative methods are labeled cases I through IV inclusive.

Case I illustrates a conventional one-stage condensation of the water layer operation with no scrubbing. All of the oxygenated compounds are cooled in a single condenser together with all the water in the effluent gas which condenses at the lowest temperature of the exit gas stream. This dilute mixture is then distilled in a fractionating tower to recover the concentrated neutral compounds and the dilute acid bottoms.

Case II corresponds to Figure 1 and illustrates the differential condensation process of this invention wherein the first condensate is used to scrub the overhead gas from the second condensation step. No auxiliary scrubbing medium is used in the scrubber.

Case III is a further modification of case I and includes the addition of a scrubber. The scrubbing liquid is part of the acid bottoms water obtained from fractionating the total condensate of the one-stage water layer condensation.

Case IV utilizes the features of case II and in addition incorporates the use of the acid bottoms mixture from the distillation step as an auxiliary scrubbing liquid. The acid bottoms which are essentially free of neutral oxygenated products are fed at a higher point in the scrubber than the first water condensate. In the upper region of the scrubbing zone the acid bottoms recover the acids which are stripped from the lower zone and also recover additional quantities of neutral material.

TABLE

*Comparison of recovery methods*

| Case Number | I | II | III | IV |
|---|---|---|---|---|
| Acid Bottoms Recycle—Mols | 0 | 0 | 2,340 | 2,340 |
| Condensation Efficiency: | | | | |
| Acetaldehyde percent | 21.3 | 25.5 | 27.1 | 32.4 |
| Propionaldehyde do | 24.2 | 29.7 | 30.7 | 38.3 |
| Ethyl Acetate do | 11.1 | 12.4 | 14.1 | 16.0 |
| Acetone do | 41.2 | 58.0 | 52.4 | 74.8 |
| MEK do | 21.7 | 26.3 | 27.7 | 33.9 |
| Ethanol do | 78.5 | 91.0 | 99.8 | 100.0 |
| Propanol do | 71.7 | 90.7 | 91.3 | 97.2 |
| Butanol do | 65.3 | 90.5 | 83.1 | 95.4 |
| Acetic Acid do | 98.3 | 84.2 | 98.3 | 98.3 |
| Propionic Acid do | 98.1 | 98.1 | 98.1 | 98.1 |
| Average Total Oxygenated Cmpds | 59.9 | 69.1 | 73.3 | 78.1 |
| Average Neutral Oxygenated Cmpds | 55.2 | 66.7 | 70.3 | 75.0 |
| Total Water to Fractionating Tower—Mols | 8,340 | 8,340 | 10,680 | 10,680 |

The results in the table are expressed in terms of condensation efficiency. This term is calculated in percent from $$\frac{\text{Vapor materials condensed}}{\text{Vapor materials originally present in effluent}} \times 100$$

From the comparison under conditions of no acid bottoms recycle to the scrubber, it is clear that the process of this invention improves the recovery of the neutral oxygenated compounds by more than 20%, e. g., an increase from 55.2% to 66.7%. In other words, the recovery of all materials more volatile than water in dilute water solution is increased. The recovery of the materials less volatile than water is decreased as these materials are stripped from the scrubbing liquid in the scrubber and are evaporated into gas. The improvement in recovery of these more volatile neutral compounds without dilution is extremely important, particularly since in certain cases their recovery is more profitable than that of the less volatile acids.

If desired, stripping of acetic acid in the scrubber can be prevented by feeding extraneous water or recycling acid water bottoms from the fractionating tower 16 to the scrubber at a point above the point where the water condensate is fed through line 9. The third and fourth columns of the table compare the recovery under conditions where sufficient acid bottoms recycle is used to give the same acid recovery for both methods. The recovery of neutral oxygenated compounds is 75.0% for the two-stage method of this invention versus 70.3% for the conventional one-stage method. The increase in recovery is much more noticeable in the case of certain of the more volatile compounds such as acetone where an increase in recovery from 52.4 to 74.8% is obtained.

The amount of water in which the desired products are diluted is the same in cases I and II but is about 28% greater in cases III and IV. A substantial increase in concentration cost is therefore involved in the latter two.

Acid bottoms is chosen as the scrubbing liquid in the upper zone in order to avoid lowering the acid concentration in the acid bottom stream. If the acids were not to be recovered, lowering the acid concentration at this point might not be of concern. In the latter case, water or even a dilute aqueous alkali solution could be used as the scrubbing liquid in the upper scrubbing zone.

The operating conditions for the example were selected on a random sampling basis and do not define the invention nor necessarily represent the optimum conditions for the gas composition and pressure chosen. The optimum percentage of the total water condensed in the first stage of the differential condensation is influenced by the gas/water ratio, pressure, cooling water temperature, and relative quantities of individual oxygenated compounds.

It is to be understood that the invention is not limited to the specific examples, which have been offered merely as illustrations, and that modifications may be made without departing from the spirit of the invention.

What is claimed is:

A process for separating and recovering neutral low molecular weight oxygenated products which are more volatile than water in the presence of water present in a gaseous mixture of uncondensible gases, hydrocarbons, fatty acids, water and the like in an effluent from an organic synthesis reaction, wherein hydrogen and carbon monoxide are the reactants, which comprises the steps of cooling and condensing the gaseous mixture in a first cooling step at a temperature above the dew-point of water to condense higher molecular weight hydrocarbons; cooling and condensing a residual uncondensed gaseous mixture from the first cooling step in at least one stage in a second cooling step at a temperature at which a major proportion of the water and fatty acids are condensed but only a minor proportion of the neutral low molecular weight oxygenated products are condensed; cooling and condensing a residual uncondensed gaseous mixture from the second cooling step in a third cooling step at a temperature lower than in the second cooling step at which lower temperature the remaining water is condensed; scrubbing countercurrently residual uncondensed gaseous mixture from the third cooling step with the predominantly water and fatty acids condensate from the second cooling step as a scrubbing medium in a scrubbing zone to recover a substantial proportion of the neutral low molecular weight oxygenated products contained in this gaseous mixture; discharging liquid bottoms containing the neutral low molecular weight oxygenated products from the scrubbing step to a distillation zone; discharging the resulting condensate from the third cooling and condensing step to the distillation zone and distilling the neutral low molecular weight oxygenated products from a resulting mixture in the distillation zone and recycling a residual liquid bottoms mixture containing fatty acids from the distillation step to an upper portion of the scrubbing zone.

WILLIAM E. CATTERALL.
ERNEST O. OHSOL.

REFERENCES CITED

The following references are of record in the file of this patent:

UNITED STATES PATENTS

| Number | Name | Date |
|---|---|---|
| 1,986,080 | Still | Jan. 1, 1935 |
| 2,476,788 | White | July 19, 1949 |
| 2,516,940 | Arnold et al. | Aug. 1, 1950 |

FOREIGN PATENTS

| Number | Country | Date |
|---|---|---|
| 250,563 | Great Britain | Aug. 29, 1927 |